United States Patent [19]
Liebermann

[11] Patent Number: 5,982,853
[45] Date of Patent: Nov. 9, 1999

[54] TELEPHONE FOR THE DEAF AND METHOD OF USING SAME

[76] Inventor: Raanan Liebermann, 79 Bayard Ave., North Haven, Conn. 06473

[21] Appl. No.: 08/653,732

[22] Filed: May 23, 1996

Related U.S. Application Data

[63] Continuation-in-part of application No. 08/396,554, Mar. 1, 1995, abandoned.

[51] Int. Cl.$^6$ .................................................. H04M 11/00
[52] U.S. Cl. ................................ 379/52; 704/271; 704/3; 379/93.15
[58] Field of Search ............................. 379/93.14, 93.15, 379/93.17, 52, 53; 348/14, 17; 395/751–757, 924; 704/2, 3, 271, 260, 235

[56] References Cited

U.S. PATENT DOCUMENTS

| | | | |
|---|---|---|---|
| 4,546,383 | 10/1985 | Abramatic et al. | 379/52 |
| 5,163,081 | 11/1992 | Wycherley et al. | 379/52 |
| 5,283,833 | 2/1994 | Church et al. | 379/52 |
| 5,313,522 | 5/1994 | Slager | 379/52 |
| 5,473,705 | 12/1995 | Abe et al. | 704/271 |
| 5,481,454 | 1/1996 | Inoue et al. | 395/753 |
| 5,544,050 | 8/1996 | Abe et al. | 395/753 |
| 5,659,764 | 8/1997 | Sakiyama et al. | 395/753 |
| 5,689,575 | 11/1997 | Sako et al. | 382/118 |
| 5,734,794 | 3/1998 | White | 704/260 |

OTHER PUBLICATIONS

The article "Application of Artificial Neural Networks IV" by Steven K. Rogers, pp. 587–599, Apr. 1993.
The article "Bidirectional Translation Between Sign Language and Japanese for Communication with Deaf–Mute People" by Kuwokawa, pp. 1109–1114, 1993.

*Primary Examiner*—Stella Woo

[57] ABSTRACT

An electronic communications system for the deaf includes a video apparatus for observing and digitizing the facial, body and hand and finger signing motions of a deaf person, an electronic translator for translating the digitized signing motions into words and phrases, and an electronic output for the words and phrases. The video apparatus desirably includes both a video camera and a video display which will display signing motions provided by translating spoken words of a hearing person into digitized images. The system may function as a translator by outputting the translated words and phrases as synthetic speech at the deaf person's location for another person at that location, and that person's speech may be picked up, translated, and displayed as signing motions on a display in the video apparatus.

32 Claims, 16 Drawing Sheets

SIGN FOR LETTER "K"
FULL IMAGE

SIGN FOR LETTER "V"
FULL IMAGE

THE SIGN FOR LETTER "K"
BINARY IMAGE

THE SIGN FOR LETTER "V"
BINARY IMAGE

TELEPHONE FOR THE DEAF AND METHOD OF USING SAME

CROSS REFERENCE TO RELATED APPLICATION

The present application is a continuation-in-part of our application Ser. No. 08/396,554 filed Mar. 1, 1995, now abandoned.

BACKGROUND OF THE INVENTION

The present invention relates to electronic apparatus for communication by the deaf, and, more particularly, to such apparatus which enables the deaf person to communicate through use of sign language.

Deaf people are employed in almost every occupational field. They drive cars, get married, buy homes, and have children, much like everyone else. Because of many inherent communication difficulties, most deaf people are more comfortable when associating with other deaf people. They tend to marry deaf people whom they have met at schools for the deaf or through deaf clubs. Most deaf couples have hearing children who learn sign language early in life to communicate with their parents. Many deaf people tend to have special electronics and telecommunications equipment in their homes. Captioning decoders may be on their televisions, and electrical hook-ups may flash lights to indicate when the baby is crying, the doorbell is ringing, or the alarm clock is going off.

However, deaf persons have substantial difficulties in communicating with persons at remote locations. One technique which is employed utilizes a teletype machine for use by the deaf person to transmit his message and also to receive messages, and the person with whom the deaf person is communicating also has such a teletype machine so that there is an effective connection directly between them. In another method, the deaf person utilizes a teletype machine, but the person who is communicating with the deaf person is in contact with a communications center where a person reads the transmission to the hearing person over the telephone and receives the telephone message from the hearing person and transmits that information on the teletype machine to the deaf person. Obviously, this teletype based system is limited and requires the deaf person to be able to manipulate a teletype machine and to understand effectively the written information which he or she receives on the teletype machine. Processing rapidly received written information is not always effective with those who have been profoundly deaf for extended periods of time. Moreover, a system based upon such teletype transmissions is generally relatively slow.

The widespread availability of personal computers and modems, has enabled direct communication with and between deaf persons having such computers. However, it is still required that the deaf person be able to type effectively and to readily comprehend the written message being received.

Deaf persons generally are well schooled in the use of finger and hand signing to express themselves, and this signing may be coupled with facial expression and/or body motion to modify the words and phrases which are being signed by the hands and to convey emotion. As used herein, "signing motions" include finger and hand motions, body motions, and facial motions and expressions to convey emotions or to modify expressions generated by finger and hand motions. A written message being received on a teletype machine or computer may not convey any emotional content that may have been present in the voice of the person conveying the message.

Profoundly deaf people communicate among themselves by this sign language on a face to face basis, and utilize a Tele-Typewriter (TTY) for telephone communication. The TTY itself leaves much to be desired, since their sign language is a modified syntax of the spoken language, resulting in a smaller vocabulary and lessened ease of reading printed text as a whole (e.g. definite and indefinite articles ["the", "a", "an"] are omitted most of the time and possessives and plurals are not usually distinguished.

When it comes to communication of profoundly deaf persons and normally hearing persons, the problem intensifies. Only a negligible percentage of the non-deaf population is versed in sign language. Thus, some deaf people read lips and utter words similar enough in their vocal resemblance to enable them to be understood. Beyond this tedious and taxing effort, there is virtually no form for such communication except exchanging some written notes or having an interpreter involved.

A number of methods as to how to achieve sign recognition have been proposed in the literature. However, in spite of the apparent detail of such articles, they do not go beyond general suggestions, which fail when tested against the development of enabling technology. Major problems have been impeding the success of such enabling technology.

The Kurokawa et al article entitled "Bi-Directional Transmission Between Sign Language And Japanese For Communication With Deaf-Mute People" Proceedings of the 5th International Conference on Human Computer Interaction, 2, 1109 (1993) described how limited recognition can be achieved of static gestures utilizing electromechanical gloves which are sensor based and Kurokawa digitizes the electromechanical output of sensors. Capturing images with a camera is a well known art, but interpreting such images in a consistent way without relying on the human brain for direct interpretation (i.e., machine interpreted images) has alluded researches. The Rogers article entitled "Proceedings SPIE-The International Society For Optical Engineering: Applications of Artificial Neural Networks", IV, 589 (1993), suggests various approaches which cannot work when tested in a real life situation, such as utilizing infrared for signal interpretation. Unfortunately, one cannot combine the technology of Rogers and Kurokawa to solve the problem because the technologies employed are mutually exclusive. If one uses images as Rogers proposes, one cannot obtain from them the information provided by the sensors of the data gloves of Kurokawa; if one uses Kurokawa's gloves, one cannot utilize the camera images to provide any intelligence, knowledge or information beyond what the sensors in the DataGloves provide. Therefore, a fresh approach to the problem is necessary.

Displaying signed motions presents another challenge. A simple database of all possible signed motions which is an intuitive approach is rather problematic. To create a lucid signing stream, one needs a smooth movement from one word or phrase to another. Otherwise, the signing is jerky at best if not totally unintelligible. Although there may have been suggestions for such a database of signing images, this is not a realistic resolution due to the fact that, for every signed image in the database, one will need to have an enormous amount of connecting movements to other potential gestures, increasing dramatically the size of the database. To select a signing stream, inclusive of all the proper intermediary connecting gestures between previous and current images needed for lucid signing presentation, from such an enormous database puts search algorithms to an unrealistic challenge.

Attempts have also been made to transmit digitized signing motions to a central station as disclosed in Jean-Francois Abramatic et al, U.S. Pat. No. 4,546,383. Even when images are transmitted as proposed by Abramatic et al, the edge detection performed fails to enunciate detail of overlapping hands, or to differentiate between finger spelling and signed motions. All such attempts are restricted by available bandwidth which curtails wide use of such methods.

It is an object of the present invention to provide a novel electronic communication system for use by deaf persons to enable them to communicate by signing.

It is also an object to provide such an electronic communication system wherein the deaf person and the person communicating with the deaf person do so through a central facility containing a translating means for processing elements of digitized image data.

Another object is to provide such a system in which a hearing person may have his speech converted into digitized signing motions which are displayed to the deaf person.

A further object is to provide a unique method utilizing such an electronic communication system to enable communication by and to deaf persons.

SUMMARY OF THE INVENTION

It has now been found that the foregoing and related objects may be readily attained in an electronic communications system for the deaf comprising a video apparatus for observing and digitizing the signing motions, and means for translating the digitized motions into words and phrases. Also included are means for outputting the words and phrases in a comprehensible form to another hearing person, generally as artificial speech.

In a telephone type system, the other person is at a remote location, although the system may also be used as a translator for communication with a person in the immediate vicinity. Generally, the video apparatus is a video camera.

From cost and portability standpoints, the translating means is at a remote location or central station and there is included transmission means for transmitting the digitized signing motions or their digital identifiers to the translating means.

In addition to use of a database of words and phrases corresponding to digitized motions, the translating means also includes artificial intelligence for interpreting and converting the translated motions into words and phrases and into coherent sentences.

The outputting means may convert the coherent sentences into synthetic speech or present the words and phrases in written form.

To enable communication of the deaf person, the system includes means for the other or hearing person to transmit words and phrases. The translating means is effective to translate said words and phrases into digitized signing motions, and the video apparatus includes a display screen which provides an output of the digitized signing motions on the display screen for viewing by the deaf person.

There is included means for translating speech into digital data representing words and phrases and such digital data into digitized signing motions. Desirably, the video apparatus includes a display screen to provide an output of the digitized motions as signing motions on the display screen for viewing by the deaf person. The video apparatus also includes a microphone and speaker whereby a deaf person may communicate with another person in the immediate vicinity.

DETAILED DESCRIPTION OF THE PREFERRED EMBODIMENT

Figure 1:
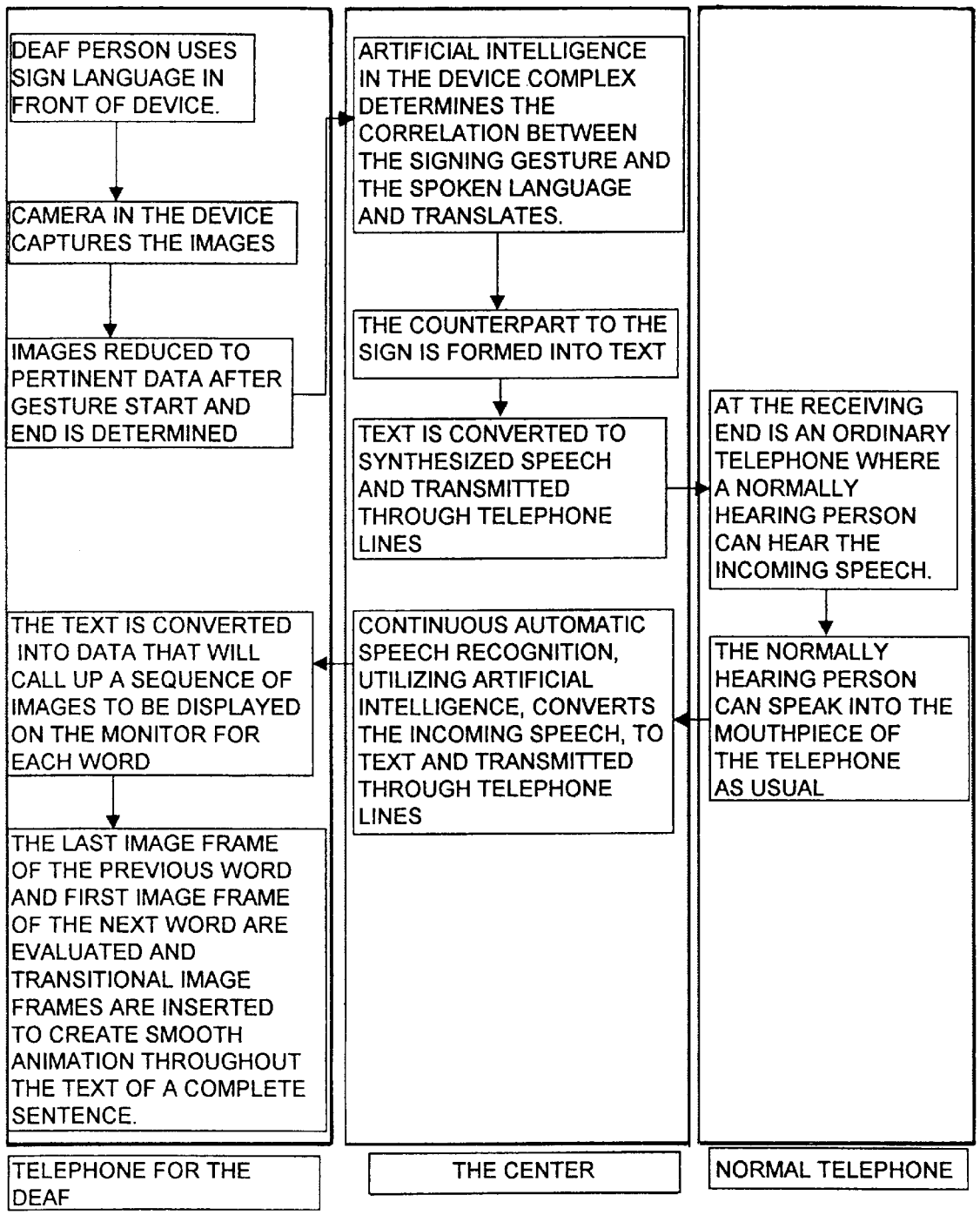
FIG. 1 is a schematic presentation of the steps performed in an electronic communication system embodying the present invention.

Turning first to FIG. 1 of the attached drawings, therein illustrated schematically is an electronic communications system embodying the present invention.

Generally, the deaf person uses sign language in front of a device containing a video camera. The images captured by the camera at 20–30 frames/second are processed by a digital device which does initial and extended image processing. In the processing, each of the frames containing a captured image undergoes a process whereby the image is transformed into manageable identifiers. It is the set of identifiers, in the form of tables of numbers, that travels the normal telephone lines to the central processing facility (i.e., the Center). These identifiers, and not the images themselves, are then correlated with a database of vocabulary and grammar by using artificial intelligence at the Center. Subsequently, syntax rebuilding occurs, again utilizing artificial intelligence, resulting in a complete verbal text which is equivalent to the signed language content. The text then undergoes a text-to-synthesized-speech transformation and the speech is sent as an analog signal to any ordinary telephone utilized by a hearing person by existing copper or fiberoptic telephone lines. Part of the artificial intelligence referred to above consists of neural networks which are trained for these specific applications.

On the other end of the telephone line, the normally hearing person talks on his or her conventional telephone in the normal and regular way of spoken language. His or her voice is carried on line (in whatever method of transport is utilized by the telephone carrier) to the Center where speech recognition algorithms convert the spoken word to text. The Center will accommodate appropriate speech recognition (i.e., automatic, continuous and speaker independent). The recognized speech is then transformed into its equivalent signing content vocabulary and then into text. The text is sent via the telephone lines to the device used by the deaf person and converted to signing animation. Depending upon the transmission line and computer capability of the deaf person's location, the text may be sent as reduced identifiers which are converted into animated images by the deaf person's computer or as completely formatted animated images. The sign images then appear on the screen of a monitor viewed by the deaf person, resulting in a continuous dynamic set of animated sign language motions which portray the content of the spoken language uttered as speech by the normally hearing person.

Figure 2:
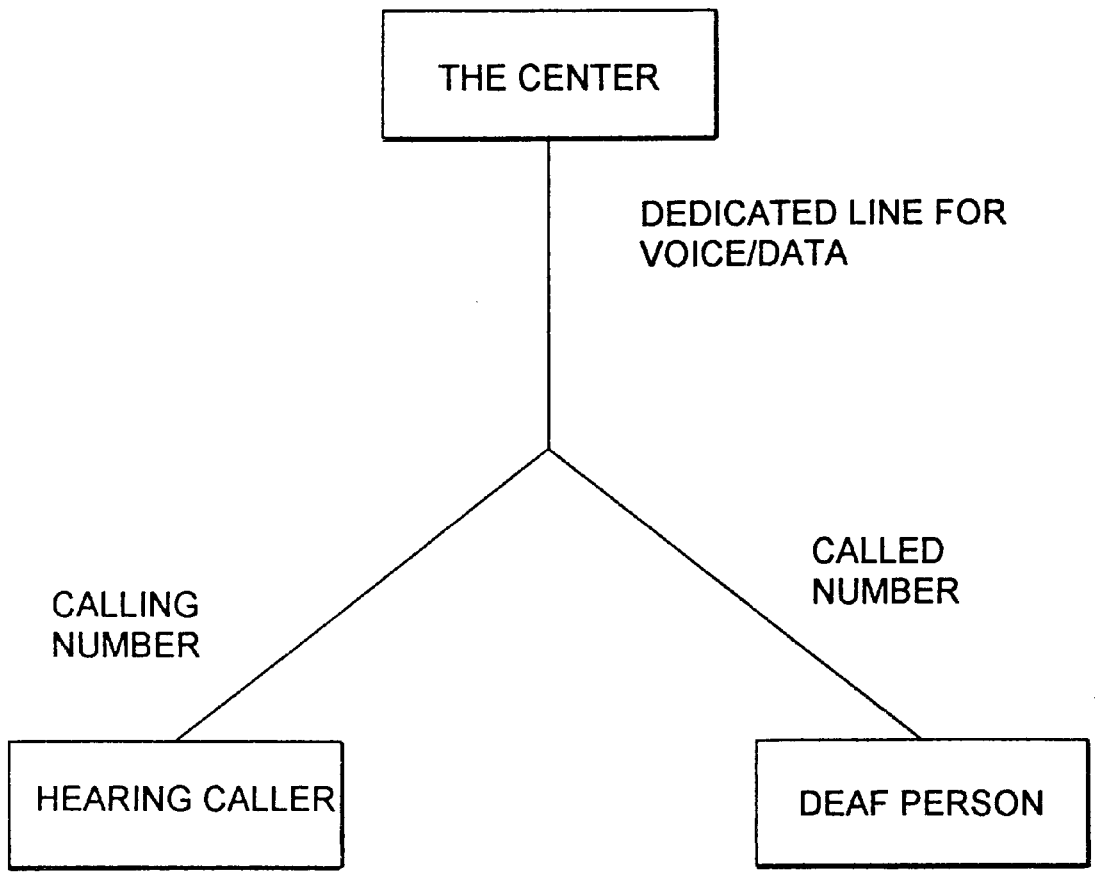
FIG. 2 is a schematic representation of a method for connecting an incoming call on the deaf person's telephone to a processing center providing the computer software for the translating functions of the present invention.
Figure 3:
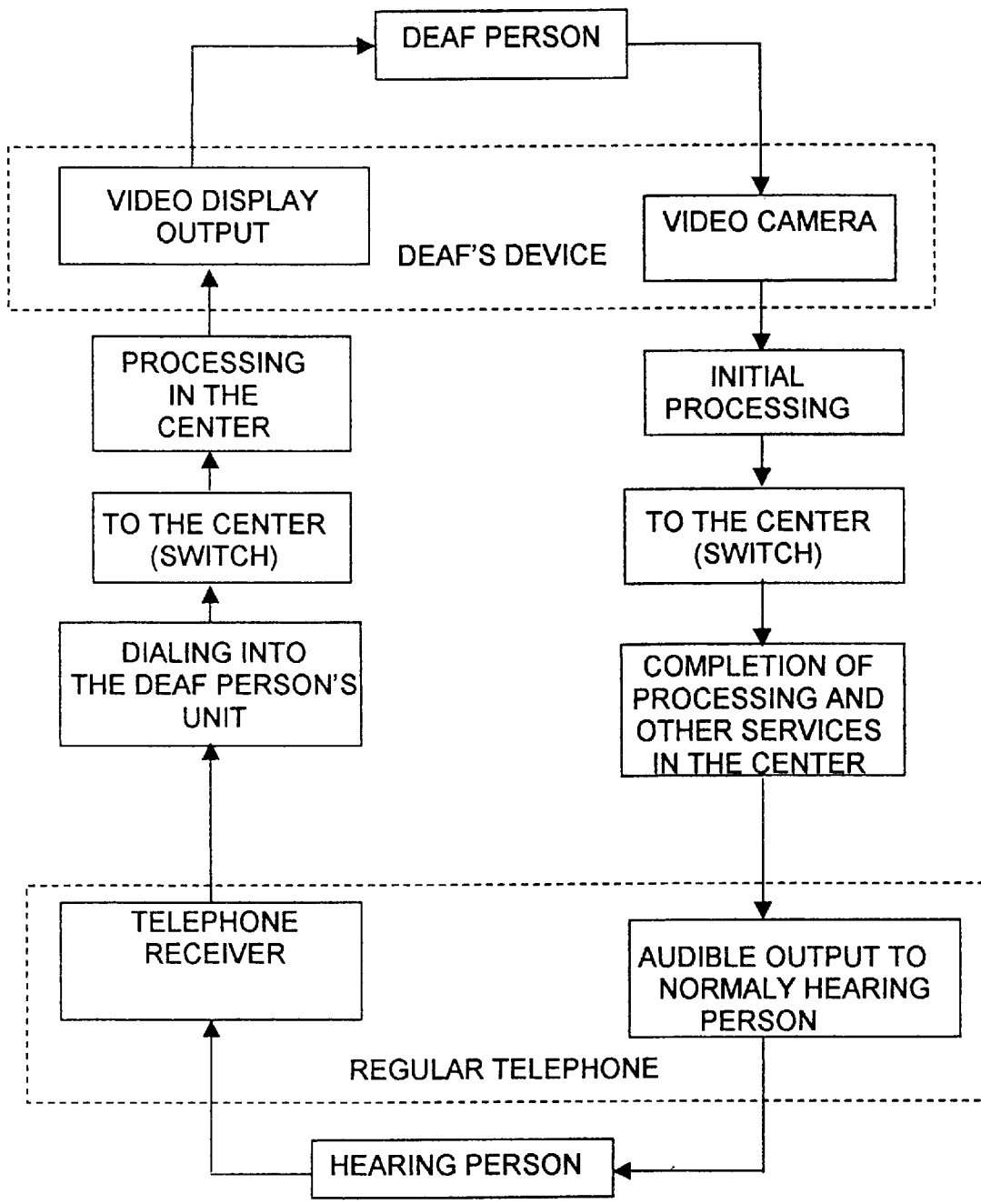
FIG. 3 is a schematic representation of the functions when utilizing such a processing center.

In view of the computer processing requirements, a preferred form of the present invention includes a processing center containing the sophisticated computer equipment, databases and neural networks to effect the signing/verbal translations, and the communications are conducted through this center. As seen in FIG. 2, a caller (or receiver) and deaf person are actually communicating through such a center. The method of employment of the center is illustrated in FIG. 3 wherein the center receives the input from the video device of the deaf person and provides an audible output to the hearing person who is using a telephone. The hearing person speaks into the telephone and the center provides a video output to the video device of the deaf person.

Figure 4:
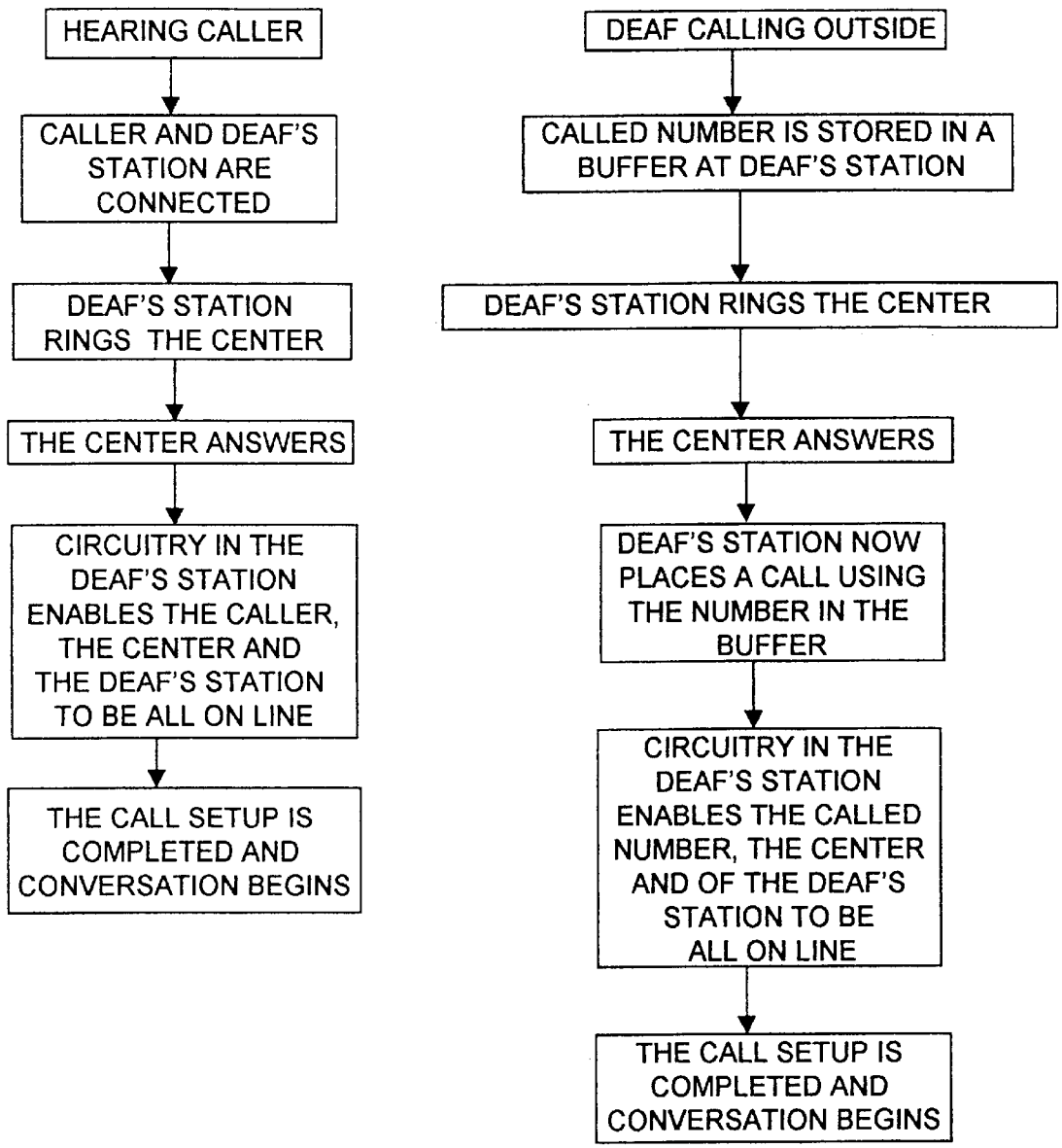
FIG. 4 is a schematic presentation of the several steps in the intervention and operation of the processing center when a call is received by the deaf person's telephone.

To avoid excessive costs for a hearing caller, the telephone installation of the deaf person receiving a call may automatically call the center and switch the incoming call to a routing through the center as is illustrated in FIG. 4.

Figure 5A:
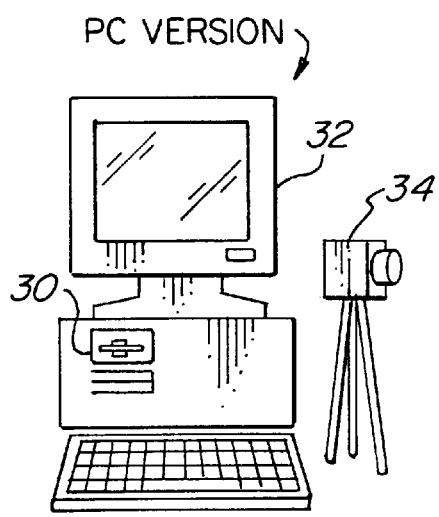
FIGS. 5a–5c are perspective views of a deaf person's receiver/transmitter installation embodying the present invention in three different forms using a personal computer and video camera, using a television set with a video camera, and as a public telephone kiosk.
Figure 5B:
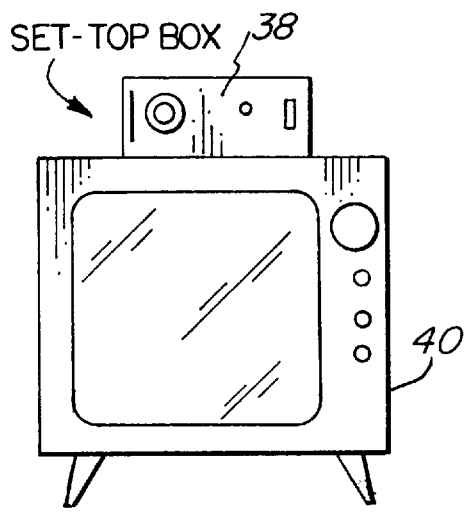
Figure 5C:
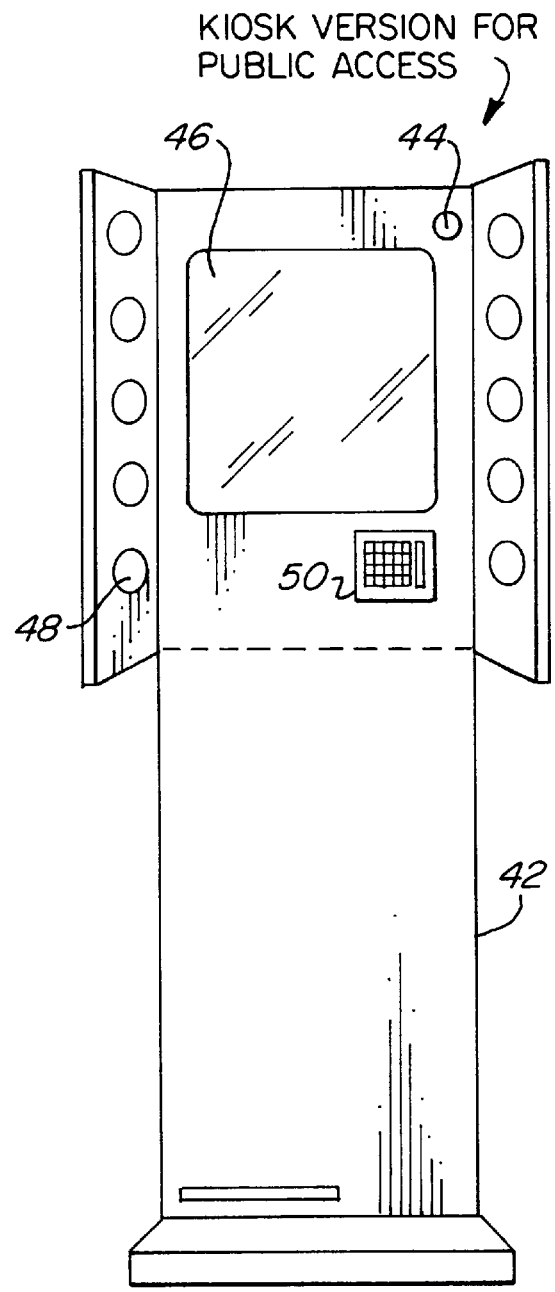

In FIG. 5a, the deaf person's station comprises a personal computer 30 including the monitor 32 and a video camera 34. In FIG. 5b, a computer unit 36 and a video camera 38 is utilized on top of a standard television set 40 so as to be at hand level. In FIG. 5c, a public kiosk 42 has built into it, a video camera 44, a video monitor 46, and lamps 48 to ensure adequate lighting of the user's hands, face and body. To place the call, there is a keypad 50, and a credit card reader may be combined therewith.

Figure 6:
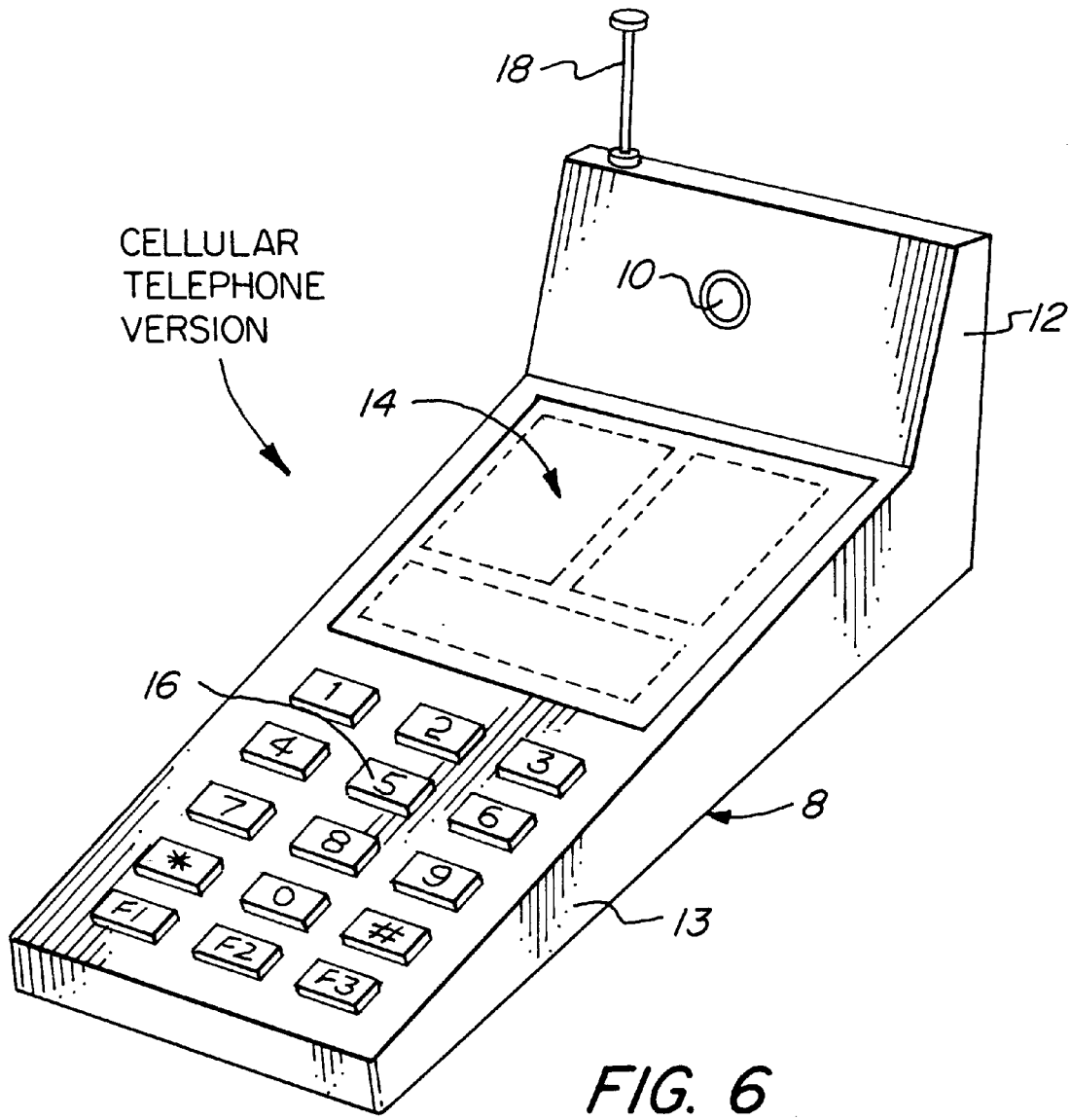
FIG. 6 is a perspective view of the present invention in the form of a cellular telephone.

A portable transmitter/receiver generally designated by the numeral 8 for use by a deaf person is shown in FIG. 6 and it contains a video camera, the lens 10 of which is disposed in the upright portion 12. In the base portion 13 are an LCD display panel 14 and a key pad 16 for dialing and other functions. Also seen is an antenna 18 for the device so that it may be transported and communicate as a wireless remote or through a cellular telephone network. The device is supported in a stable position and the deaf person is positioned so that the camera lens 10 will record the signing movement of the hands and fingers and body and facial motions and expressions. The signing motions captured by the camera are converted into digital data for processing by the translation software, (i.e., artificial intelligence) to produce data representing numbers, words and phrases which are then combined into coherent sentences. As previously indicated, such translation is most economically effected in a dedicated central computer facility. The translated message is then conveyed to the "listener" in either verbal or written form.

The other party may speak into a telephone receiver (not shown) and the verbal expressions are translated by the artificial intelligence into digital data for signs. These signs are displayed on the LCD panel 14.

Figure 7:
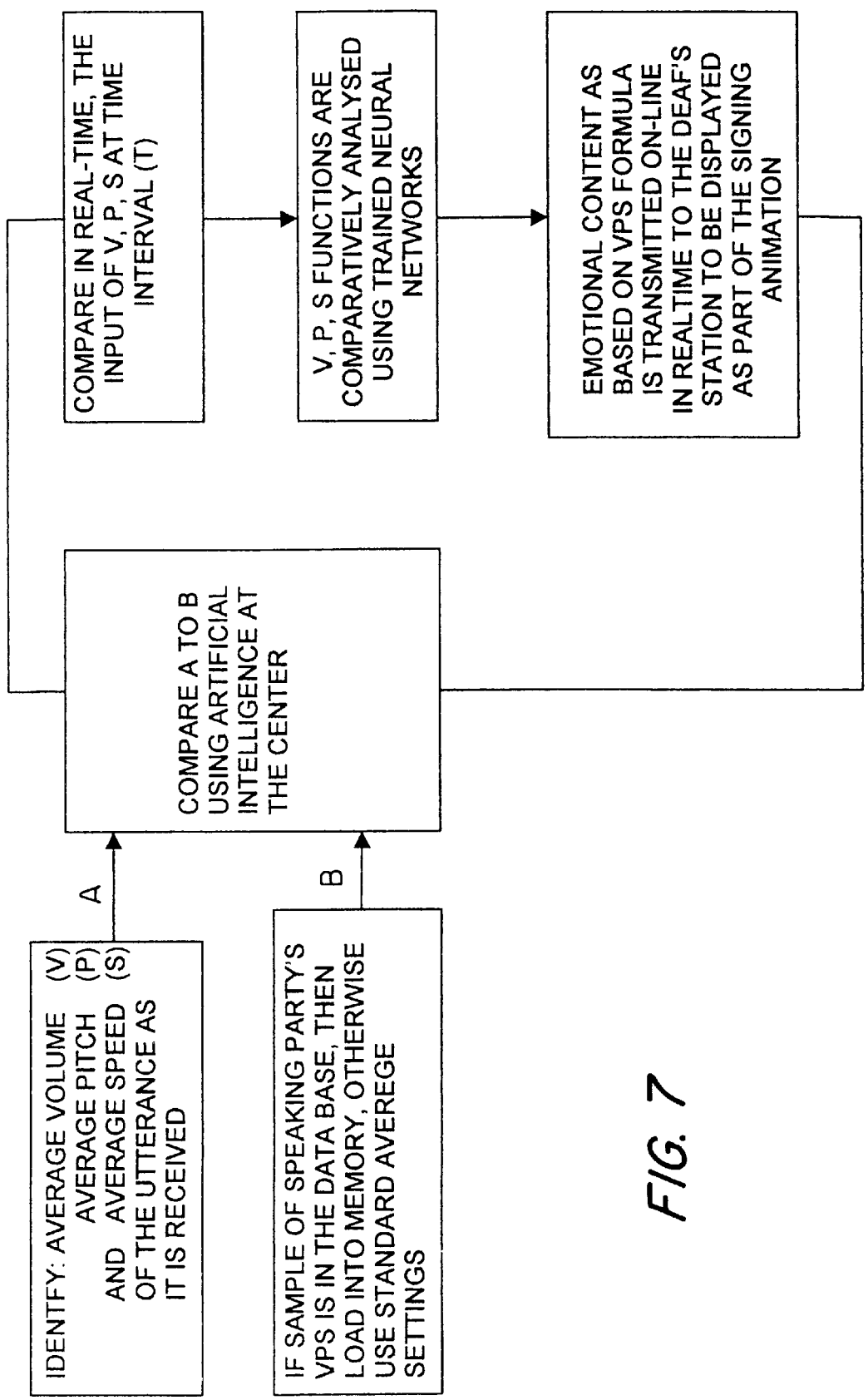
FIG. 7 is a schematic representation of artificial intelligence used to determine and translate the emotional content in the speech of a hearing person communicating with a deaf person.

Since the emotional content of the speech of the other party is not conveyed by signs, the artificial intelligence in the system may provide an analysis of the emotional content of the speech and convey this to the LCD display panel as a separate output. Indicative of the functions of the artificial intelligence software for doing so is the diagrammatic presentation in FIG. 7.

This is portrayed to the deaf either as a separate image in a corner of the screen which he or she is watching or incorporated into facial expressions of animated signing figures.

Figure 8:
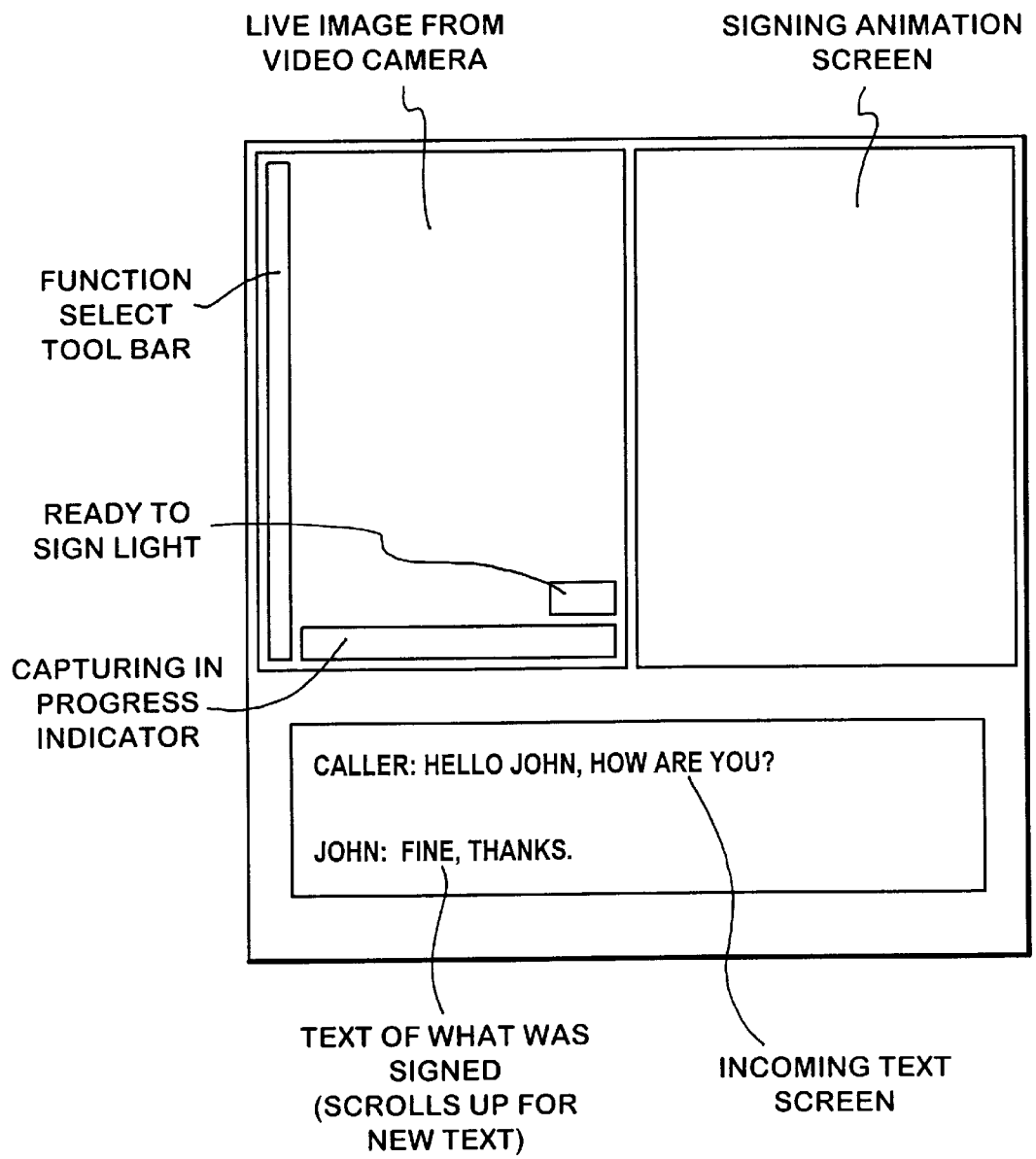
FIG. 8 is a diagrammatic representation of the manner in which the screen of a display unit may be divided into sections presenting elements of information in addition to signing motions.

Turning next to FIG. 8, therein illustrated is a layout for the visual display to present multiple information to the deaf person such as touchless function buttons, system status indicators, alarms, a printed translation, and a playback of the image being recorded, as well as the signing images and text of the hearing person's responses.

FIGS. 9–12 are schematics of the system software modules for converting signing to speech and speech to animation, including system training methods.

The overall operation of a preferred electronic communications system is set forth hereinafter.

The deaf person uses sign language in front of the transmitter/receiver device containing the camera. The images captured by the camera are of the finger and hand motions and of body motions and of facial expressions and motions captured by a digital device which does initial processing. In the initial processing, each of the frames containing a captured image undergoes a process whereby the image is collapsed into a small set of fixed identifiers. At the end of the initial processing, the resulting information is sent as data on a regular and designated phone line using an internal modem in the device to the data processing center.

The rest of the processing is completed at the center. This includes identification of the letters, numbers and words, conversion to standard sign language, and the conversion to spoken language which results in the equivalent text of the signed content. The text then undergoes a text to synthesized speech transformation and the speech is sent as an analog content to the normally hearing person. The voice content may leave the center as data if packet switching (64 kb or 56 Kb service) is utilized directly from the center. Processing in the center utilizes artificial intelligence such as neural networks trained for the specific applications of the device.

The normally hearing person who calls a deaf person dials the deaf person's phone number. However, at the deaf person's station, his or her call is connected to the center on a single line which is the deaf person's designated line to the center. The deaf person's device arranges for switching and enables both the caller and his or her station to be on line as a "party call". The deaf person's station also arranges for the simultaneous transmission of both voice and data on the dedicated line. Thus, the line between the normally hearing person and the deaf person is analog for voice content only, while the line between the deaf person (and now the normally hearing person too) is analog but transfers both voice and data.

The normally hearing person's voice undergoes speech recognition in the center and is transformed into the equivalent signing content and then into textual material. The text is sent from the center to the deaf person's device via telephone lines. Software in the device converts the text into reduced identifying pointers for each gesture, which are then converted into animated images which portray in sign language the content of the speech processed in the center.

In a cellular phone, the operation is much the same in its operation as the hard wired telephone. The camera in the cellular phone transmits the image for initial processing in the cellular phone. From there the reduced data is transmitted to the center for processing. The same switching occurs here as well, and voice/data is sent to the center on the dedicated line assigned for the deaf person. However, in this case the cellular phone maintains two cellular connections on line, one to the center (voice/data) and one to the caller. The deaf person sees the content of the call to him by viewing the display LCD on his cellular phone unit.

When the phone for the deaf is equipped with a microphone and a speaker instead of, or in addition to a second telephone channel, it may be turned into a communicator. Obviously, one can opt to have both of these options to double the usefulness of the device. The communicator enables the deaf person to conduct a "conversation" with any normally hearing person in the close proximity. The signing motion of the deaf person are processed by the center and is transmitted back to the device as a normal voice transmission which the speaker renders as speech to the normally hearing person. His or her speech in turn, is picked up by the microphone and sent to the center for processing. The result is an animated content on the LCD of the communicator which portrays in sign language the spoken content of the normally hearing person.

Figure 9:
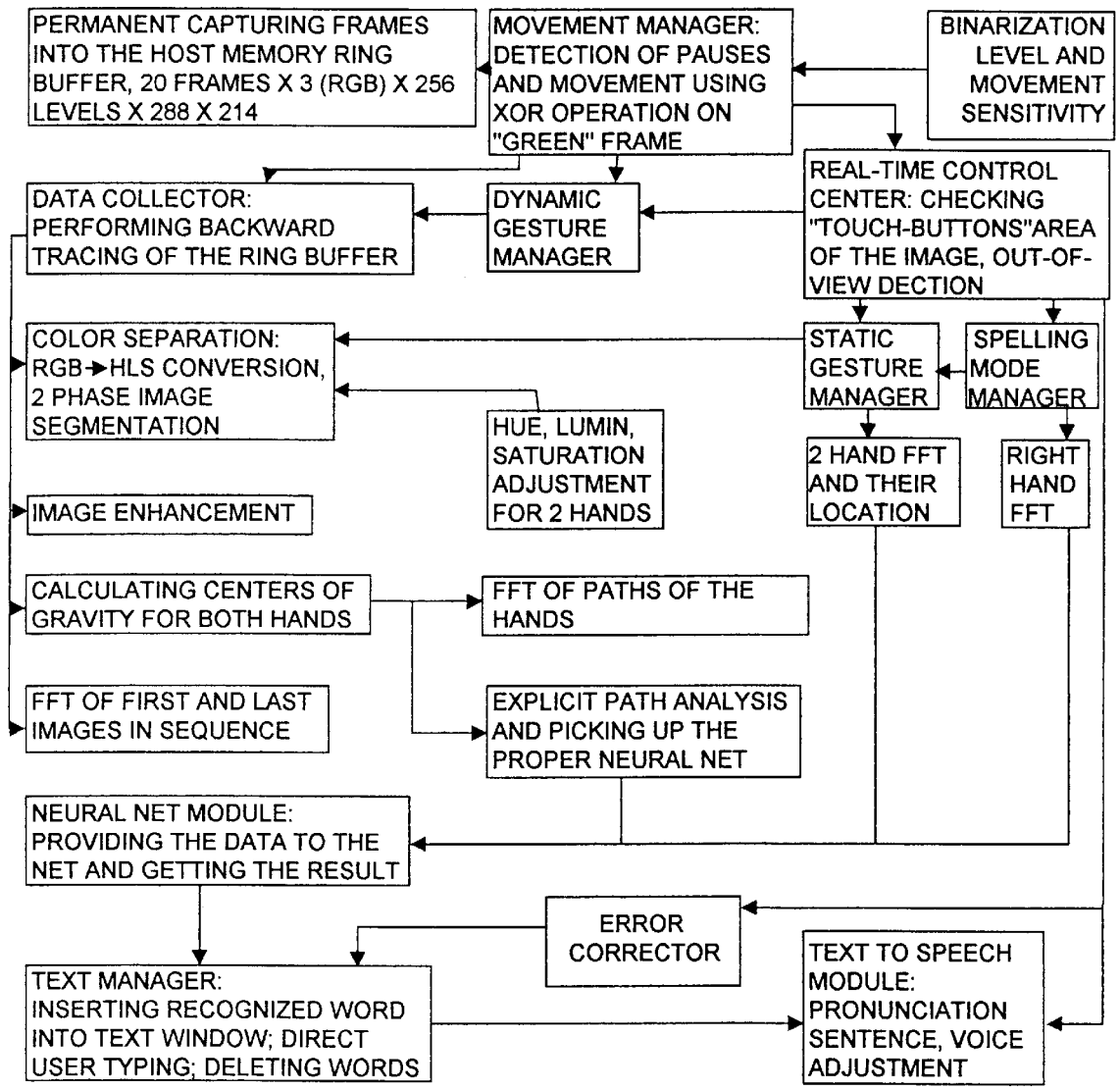
FIG. 9 is a schematic representation of the modules of the artificial intelligence for converting signing into speech.
Figure 10:
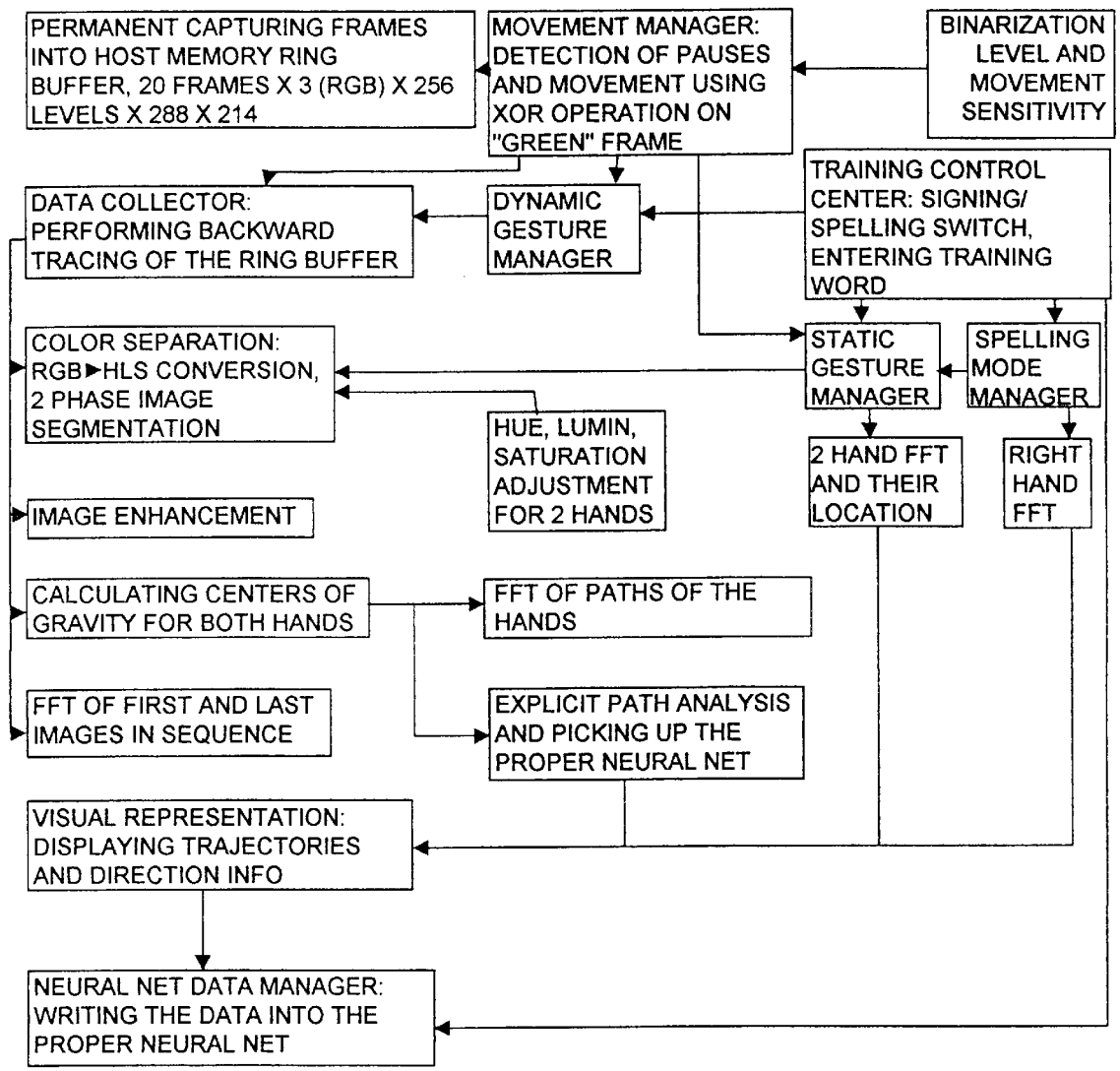
FIG. 10 is a schematic representation of the modules for creating multiple neural networks and collecting the necessary examples for training these networks.
Figure 11:
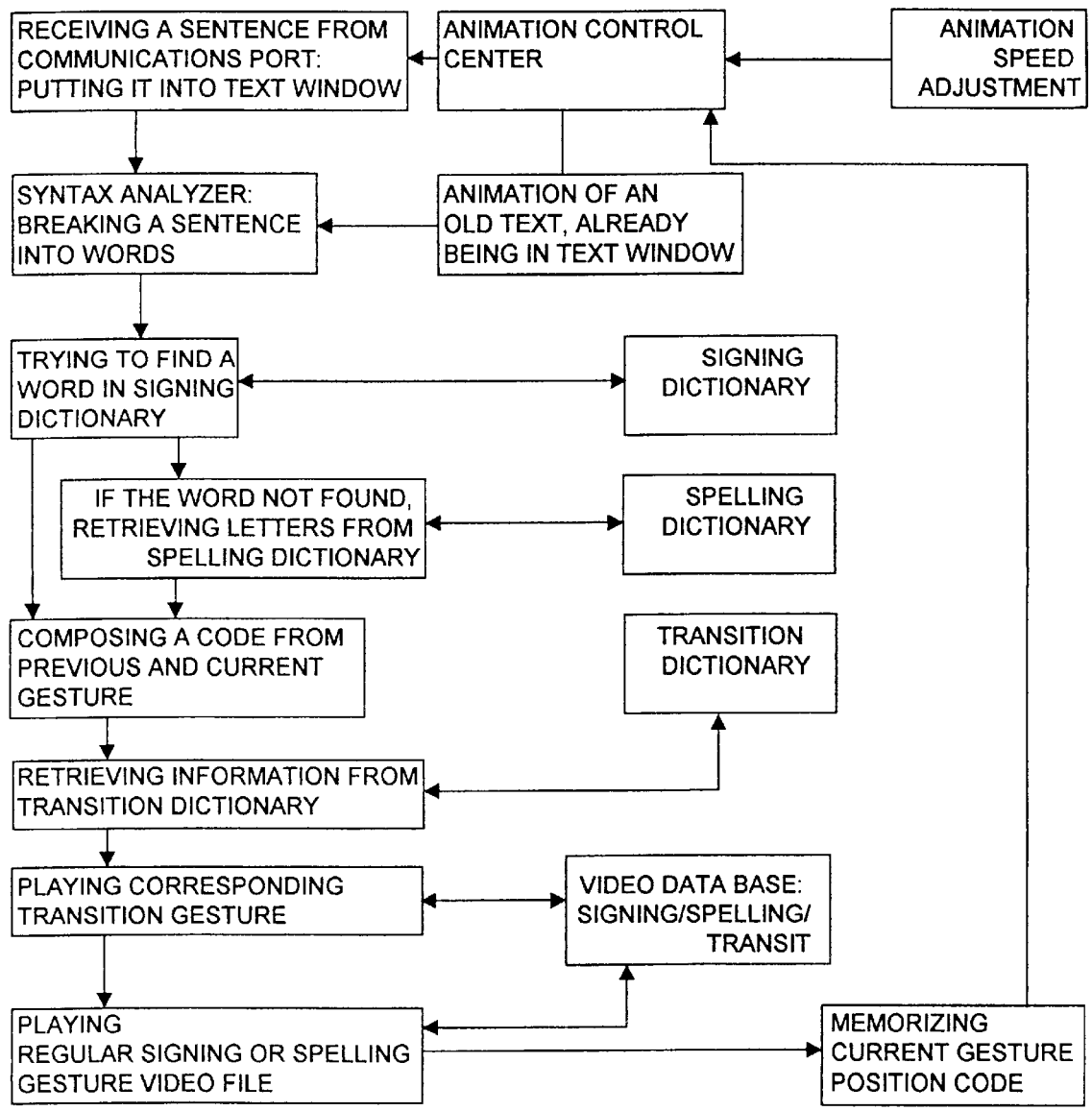
FIG. 11 is a schematic representation of the modules for controlling the conversion of text to signing animation.
Figure 12:
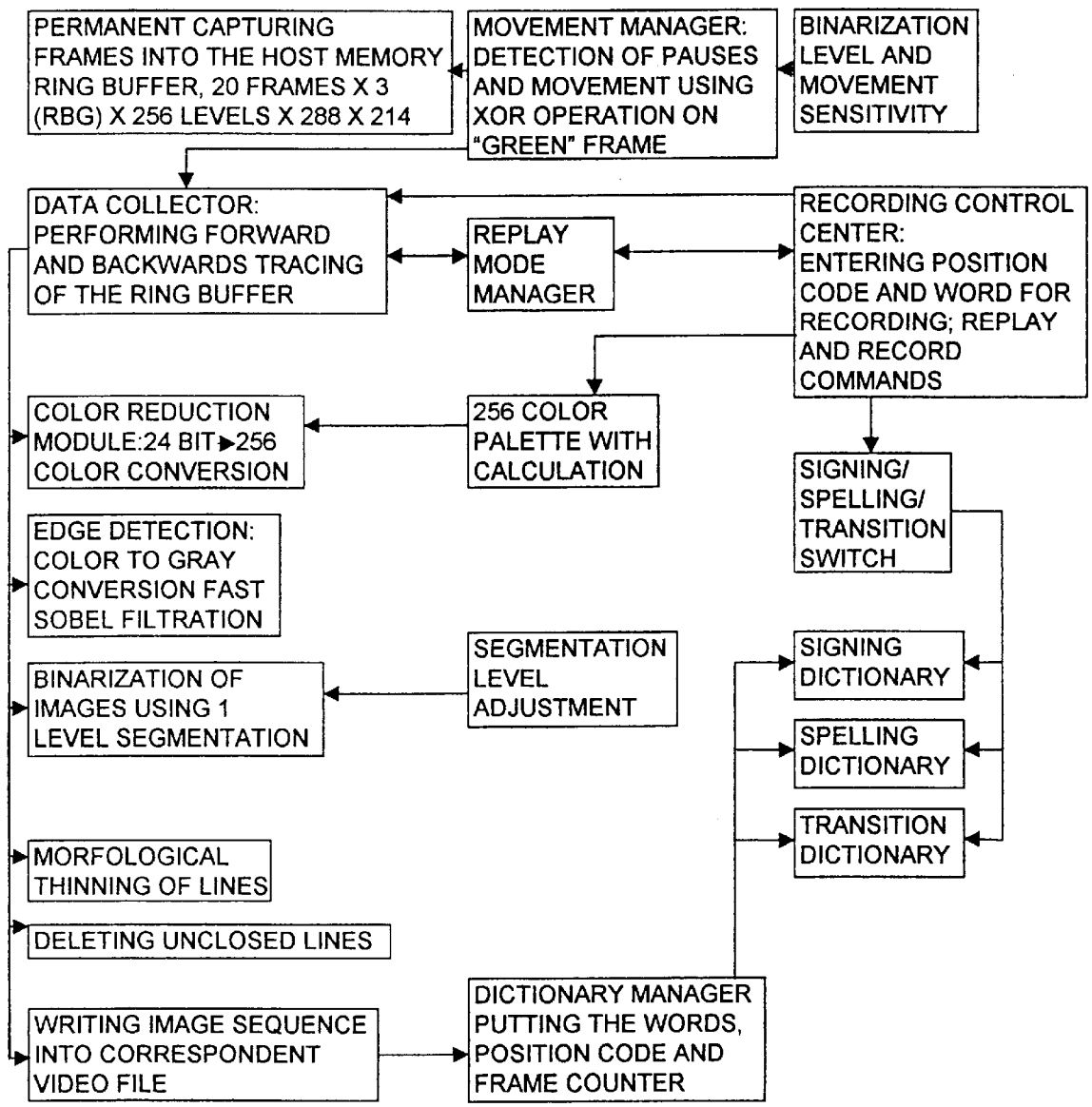
FIG. 12 is a schematic representation of the modules for capturing and compressing the images to be used during the playback of sign language animation.

The modules for the software effect translation of the signing into and from digital text are set forth in FIGS. 9 and 10 and those to recognize animation are set forth in FIGS. 11 and 12. Software presently used for this purpose is appended hereto and is utilized with Borland C++.

A person engaging in the development of other software should consider the following with respect to figure tracking:

A. The groups listed below are captured in their separate forms, then added to integrated forms. The integrated forms are then integrated into a single observable signing (i.e. our normalized signing with a single camera), while location information are kept in a separate log. The separate log can have various usages which may not be in their entirety related to signing on the phone. Such can be the case of activating an ATM machine or food billboard in a drive-in situation.

a. Definitions:
  L(h):=Left hand
  L(a):=Left arm
  R(h):=Right hand
  R(a):=Right arm
  L(H):=Left side of the head
  R(H):=Right side of the head
  L(T):=Left side of torso
  R(T):=Right side of torso
  L(T):=Left side of torso
  R(f):=Right femur
  L(f):=Left femur
  R(t):=Right tibia
  L(t):=Left tibia B. Section addition with recognition takes place:
b.1. A=L(h)+L(a)
  B=R(h)+R(a)
  C=L(H)+R(H)
  D=L(T)+R(T)
  E=L(t)+L(f)
  G=R(t)+R(f)

c. Signing content (Sc):
  S=A+B d. Emotional content (Ec):
  Ec=C+D e. Pointing and activation (PA):
  PA=A+B f. Location in space (Ls):
  Ls=E+G+(C+D+A+B)

In seeking to have the software recognize emotional content in the signing or in the speech, the following should be considered:

Our emotional content is divided into two separate segments:

A. The hearing person segment
B. The hearing challenged segment
  A. The hearing person segment.
  In this segment we analyze in the speech four distinct elements:
  A.1. Changes in various speech output elements.
  A.2. Duration of changes recognized in A.1.
  A.3. Frequency of the changes appearing in A.1.
  A.4. Frequency of the duration of changes appearing in A.2.
  The elements that are analyzed by A.1., through A.4. are:
    a. Pitch
    b. Volume
    c. Non words elements for which the system is trained (g.g., gasps of air, emitting the word "ah, chuckle, crying, etc.)
    d. Repetitions of words and/or word parts (indicating stuttering).

B. The hearing challenged person segment.
  This segment analyzes combination of intrafacial positions, where the system utilizes the training similar to signing, but with different attributes and meanings.
  a. Definitions and variables status;
    U(I):=Upper lip [showing=1, not showing=0]
    LL(1):=Lower lip [showing=1, not showing=0] (m):=Left part of mouth [compressed=1, uncompressed=0]
    R(m):=Right part of mouth [compressed=1, uncompressed=0]
    M( ):=Complete mouth as a unit [Opened wide=1, closed=0;
      compressed and drawn in=4;
      compressed and downward=5;
      stretched flat=6;
      opened with teeth showing=7]
    U(t):=Upper front teeth [showing=1; not showing=0]

LL(t):=Lower front teeth [showing=1; not showing=0]
t():=Frontal teeth as a whole [shown=1; not shown=0]
R(n):=Right nostril [expanded=1; unexpanded=0]
L(n):=Left nostril [expanded=1; unexpanded=0]
L(cb):=Left cheek bone [raised=1; unraised=0]
R(cb):=Right cheek bone [raised=1; unraised=0]
LO(e):=Left Open eye as a whole [distance above pupil=1; no distance above pupil=0]
RO(e):=Right Open eye as a whole [distance above pupil=1; no distance above pupil=0]
LC(e):=Left closed eye
RC(e):=Right closed eye
LN(e):=Left eye narrowed
RN(e):=Right eye narrowed
R(b):=Right eye brow [raised=1; not raised=0]
L(b):=Left eye brow [raised=1; not raised=0]
N(b):=Nose bridge [two states: compressed=1; uncompressed=0]
F(f):=Frontal forehead [compressed=1; uncompressed=0]

In addition to the emotional content variable Ec, we analyze various combinations as they pertain to emotional expressions of a cultural group. For example:

The state of (i.e, showing of) to=1 and n(b)=1 means "anger".

Computer software for speech recognition and conversion to digital data presently exists and may be modified and enhanced for use in the communications system. Exemplary of such software is that of International Business Machines designated "IBM Continuous Speech Recognition Program". Similarly, commercial software may be used to convert digital data into artificial speech.

Because commercial speech recognition software is not completely accurate, it may be desirable to develop a corrective addon to increase the accuracy as set forth hereinafter:

Algorithmic Steps
a. Duplicate each incoming analog stream to provide two segments:
  1. An untouched segment (Segment A).
  2. A processed segment (Segment B).
b. Tag each segment with respect to position in the incoming stream.
c. Each segment (Segment A) can have variable length.
d. Digitize incoming analog stream.
e. operate speech recognition kernel on Segment B.
  e.1. Speech recognition kernel.
  e.2. Spell checker for word.
  e.3. Grammatic checks.
  e.4. If recognized and proper tag as Ra
  If unrecognized or improper tag as Ua
f. Tag each fully (i.e., 100%) recognized word as to its position in Segment B.
g. Deduct the recognized words of Segment B in their appropriate position in Segment B from Segment A. The result is Segment C.
  g.1. Segment C is tagged to identify its position in Segment A (Position 1).
h. Segment C is inserted into a prepared digitized speech section (which contains a message to the speech originator)
i. Digital to Analog conversion takes place.
j. The resulting analog speech segment is sent to the speech originator.
k. Return from speech originator is digitized (Segment D).
l. Segment D is inserted in position 1 in Segment A.
m. Segment A is declared 100% recognized segment and is moved to signing dispatch.

Corrective Measures
Corrective measures fall into the following.
A. Topic Assisted/using Trap words
B. Intermediary Agent Assisted
C. Speaker Assisted.
D. Spell Checker assistance.
E. Grammatic Assistance.
  A. Topic Assisted
  1. Invoking the most common nine words to decide:
    1.a. Accent/Country/Location
    1.b. Channel to subgroup section [divided into geographic and demographic (cultural) groups
  2. Invoke Trap words to locate area of discussion
  3. Utilize B-tree [C++,V4+] for list of words possibly matching word in question.

First Level of Assistance
1. This level utilizes trap words in order to determine personal speech patterns.
2 Big Nine words are evaluated in 4 tiers: Word [i.j.k.l] i=l, ... ,n; n=n(a)+n(b) where n(a)=6, and n(b)=6.
Values of n(a) or n(b) can be modified per specific situation.
  i determines the group most appropriate to determine any of the nine words.
  S=Total number of words $$S = \sum_{i=1}^{9} \text{Word } [i] = 9$$

Second Level of Assistance
1. This level traps words to determine area of discussion.
  j=1, ... ,10 i.e. Ten words for each area of concentration
  k=1, ... ,12 i.e. Twelve areas of concentration $$S(j,k) = \sum_{j=1}^{10} \sum_{K=1}^{12} \text{Word } [j,k] = 120$$

Third Level of Assistance
1. This level compares unrecognized words against groups of 20 words describing each of the 12 areas.

$$S(i,j,k,l) = \sum_{i=1}^{9} \sum_{j=1}^{10} \sum_{K=1}^{12} \sum_{L=1}^{20} \text{Word } [i,j,k,l] = 9 \times 10 \cdot 12 \cdot 20 = 21,600 \text{ words}$$

If the signer uses American Sign Language, there is a need to effect linguistic analysis beyond what was recognized by William Stokoe in Semantics and Human Sign Language, Mouton (1971), and Sign Language Structure, Linstok Press (1978).

ASL is a visual-spatial language requiring simultaneous, multiple, dynamic articulations. At any particular instant, one has to combine information about the handshape (Stokoe's dez), the motion (Stokoe's sig) and the spatial location of the hands relative to the rest of the body (Stokoe's tab). Supplementing such information and by dynamically articulating a word or a meaning, are grammatical cues provided in context and requiring attention to detail.

Repetition of words indicates plurality, vibrations signify intensity, and relative spatial distance between cooperating hands specifies magnitude. Further grammatical delineation is contributed by facial expressions. Some of the facial cues are intuitive to human emotions and simplify such correlation. For example, the eyebrows when raised indicate surprise but when drawn down in a frown like manner signify negation or suspicion. Other facial expressions have no such immediate and intuitive affect. Such as the case of utilizing tongue position. A protruding tongue synchronized with the sign "late" turns the meaning into "not yet".

Isolated grammatical similarities exist between the two languages, although their utilization in translation differs. Utilizing a number system with its siblings of ordinal numbers, age, or time as well as compounds are examples of such similarities.

Translation of compound words in a spoken language is benefited by its written presentation as a single unit, or when spoken, presentation in a continuous utterance, guarantees a unique interpretation which begets a correct translation. "Homework", "businessman", "classroom", "babysitter" are all in daily usage as independent words.

Compounds in ASL are no different than their spoken counterparts, albeit the fact that no manual dexterity is required in rapid concatenation of the components. However, in the absence of external cues accorded the spoken compound in its rapid utterance, a machine translation of ASL compound word requires a resolving algorithm.

Other routines are mandatory for quality translation involving ASL. For example, word order in the context of a spoken language should be observed. It is set by rules which are consistently applied as a way to achieve unambiguous meaning. Such a strict rule set does not exist in ASL. However, the appearance that ASL is more lax and forgiving in its scrutiny for order and thus leading to ambiguity in the resulting meaning is misleading. There are rules in ASL for breaking the rules. In fact, a particular word order rule is a corollary of a prevailing situation conveyed by the signer. Hence, there is a rule for selecting the rule of a particular word order, which together employ supplemental meaning to the sentence, while enabling a shorter exposition. The economy of exposition achieved contributes to a more efficient communication for the signing parties. Subtle but clear message is conveyed by such order. Sentences with classifiers indicating locations appear with the order of Object, Subject, Verb, while Subject preceding Object which precedes Verb singularly indicates inflected verbs. Translation algorithms which treat even the most subtle of ASL idiosyncrasies as rules, emanated from and borne out of a need to improve efficient and economic communication will attain a higher level of comprehensive quality.

Figure 15:
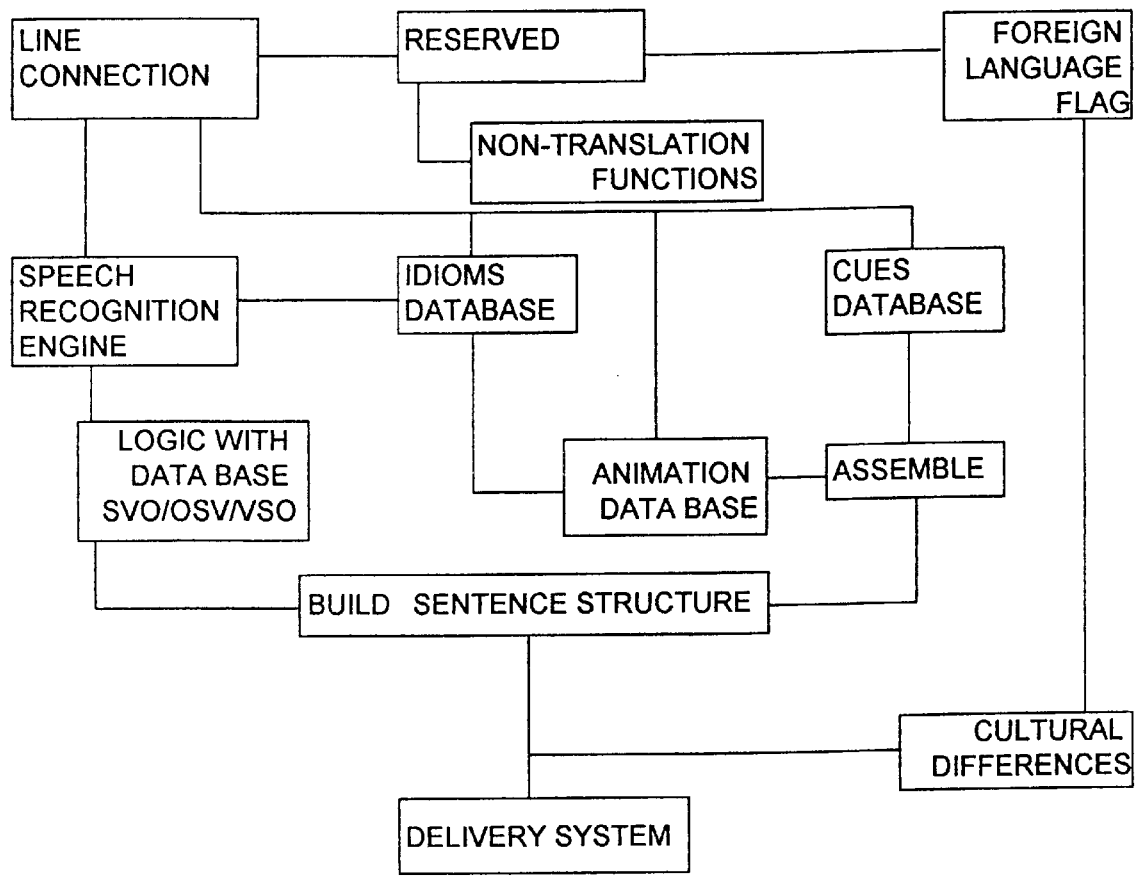
FIG. 15 is a schematic representation of the steps to effect translation of English text to American Sign Language (ASL)
Figure 16:
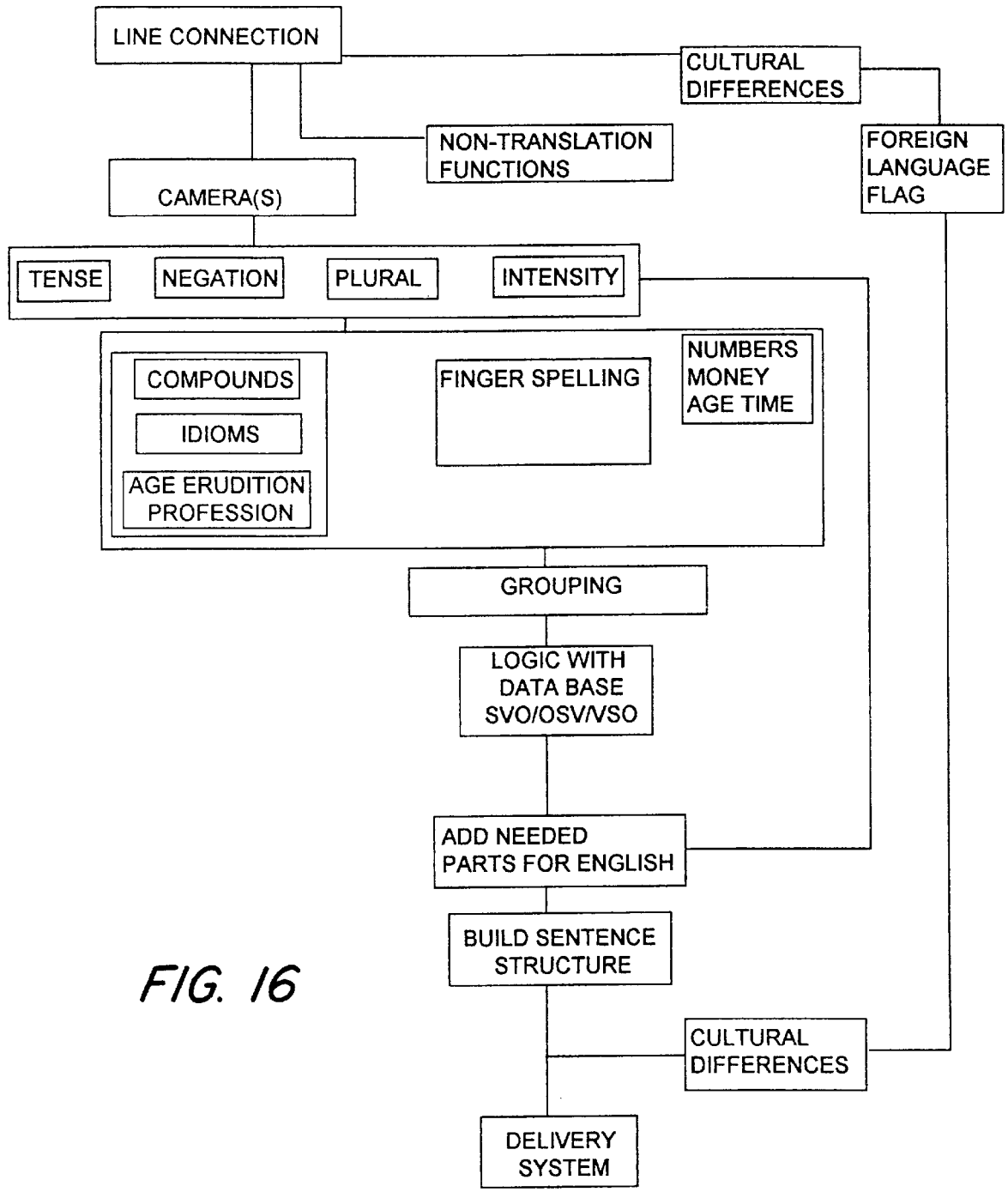
FIG. 16 is a schematic representation of the steps to effect translation of American Sign Language to English text.

The software in FIGS. 15 and 16 handles various translation issues which need resolution before an acceptable translation can follow. Issues or word order in ASL, such as the word order just discussed, are germane to the language itself.

Cultural issues require attention right from the outset. The ASL finger spelled letter "T" viewed in Europe, or ASL signs spatially located relative to the person's midsection viewed in China, will be locally construed a pejorative. Hence, identification of the expression in the context of the intended recipient, may cause the format of delivery to undergo an appropriate substitution. Therefore, the algorithms as related to telephone communication, try to identify the recipient's cultural base or geography prior to dispatch, so that the algorithmic routines for appropriate adjustments can be invoked.

Notwithstanding such efforts, the advanced group of algorithms is far from being comprehensive, and represents only the first step in a much deserving subject. FIG. 15 shows the essential components of an English to ASL translation algorithm, while FIG. 16 shown the ASL to English translation algorithm.

As will be appreciated, there is a substantial problem in effectuating real time transmission of the data as to images because of the need for compression even after discarding superfluous information. If we consider a video camera with 640 horizontal pixels and 480 lines, this means that a single frame amounts to 307,200 Bytes or 2.4576 Mbits. When considering a real time operation of 30-frames/sec, this would require 73.728 Mbits/Sec. Obviously, a bottleneck will result in the transfer to and from any acceptable storage media. Furthermore, to utilize telephone lines in a meaningful way, such as at 56 kilobits/second or even at 64 kilobits/second, it would take close to 20 minutes to transfer one second of video data. Using compression would mean a compression rate of over 1,000:1. Even resorting to compressing the data by utilizing wavelets, the level of resulting quality would be questionable. The other alternative is typically to transmit fewer frames per second, but this is an unacceptable method as it results in jerky motions and becomes difficult to interpret visual signing gestures.

In the present invention, the preferred approach is to avoid the conventional approach of trying to force some compression scheme on the data, and instead bring the data down from the frame level to a Reduced Data Set (RDS).

It will be appreciated that another significant aspect of the invention is the requirement that finger spelling be captured by the camera, undergo the RDS process,and still be recognized once artificial intelligence procedures are invoked. This task can be difficult because the frame grabber has to capture the signed gesture against the ambient surroundings, other body parts of the signing person, and clothes. Preferably, the system uses special gloves which allow discrimination of the hands from the background for the image processing system.

Figure 13A:
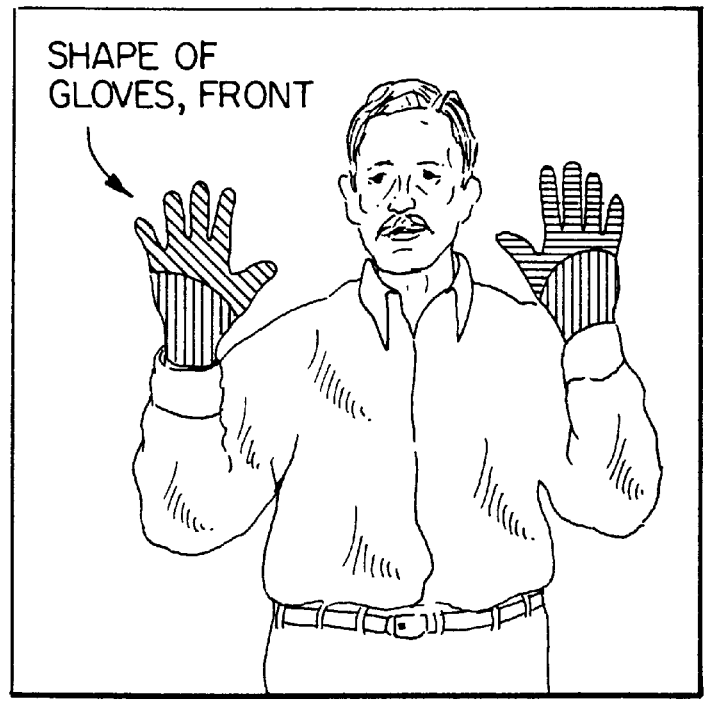
FIGS. 13 illustrates a user of the device wearing special gloves to enhance the ability of the system to identify the signing of the deaf person.
Figure 13B:
Figure 14A:
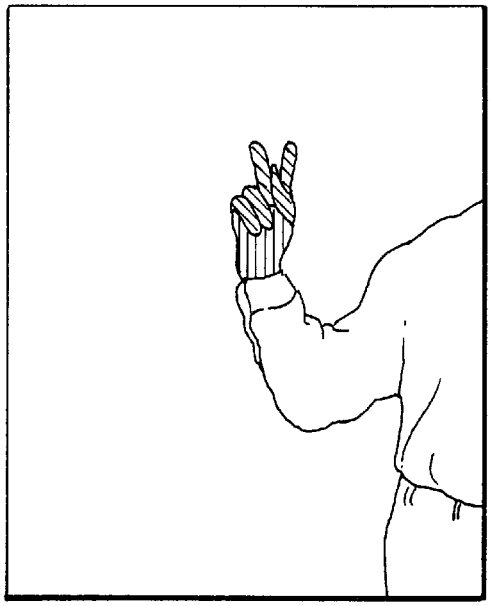
FIGS. 14a–14d illustrate the manner in which the unique shape of the glove makes it possible to recognize the differences between two very similar signs.
Figure 14B:
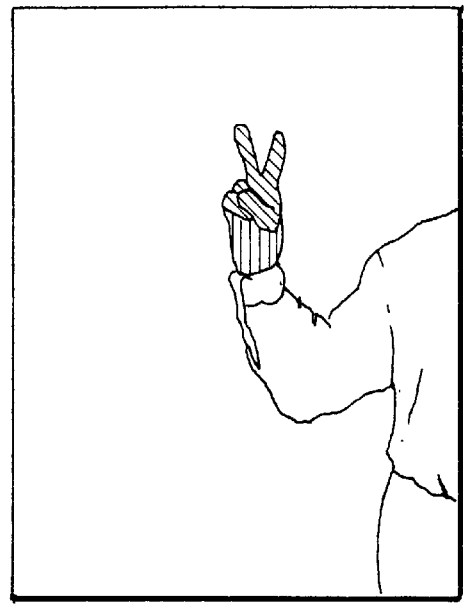
Figure 14C:
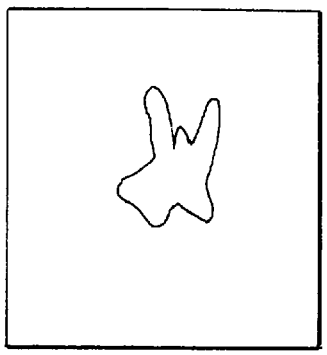
Figure 14D:
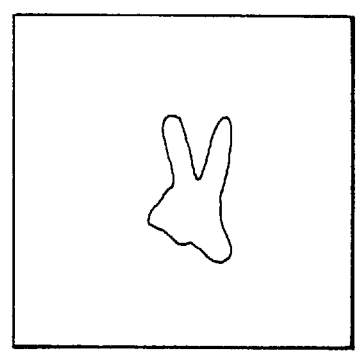

Turning now to FIGS. 13 and 14, therein illustrated is the benefit in using special gloves to enhance the ability of the system to recognize important detail of the hand shapes during the actual gesturing of sign language. Many times the hands are overlapping or touching each other. Video separation of left from right is accomplished by color separation using different saturated colors for each hand. For example, the fingers of the right hand can be distinctly green and the fingers of the left hand are distinctly blue. In addition, each glove has a third color (typically red) for left and right palm areas. This allows hand shape and finger details to be seen whenever the hand is closed vs. opened and when palm is disposed toward the camera vs. palm away.

The same type of RDS is utilized in recreating images, frame by frame, in real time, which will be displayed on the deaf person's monitor. These images will appear as smooth, continuous animation which will be easy to recognize. This is because the recreation of this animation is a result of actual frame by frame information which has been captured from a live subject and put into memory. The RDS takes up minimal memory and yet is completely on demand, interactive, and operates at real time speed.

At the end of the speech recognition, from the hearing persons' voice and text building procedure, the various words will be assembled into their counterpart animated signing gestures, starting with the table of data generated from the text that was transmitted from the center doing the frame by frame recreation for each gesture, employing special algorithms for transitional frames between gestures and then displaying them in sequence on the deaf persons' monitor.

The illustrated embodiments all utilize a single video cameras. It may be desirable to utilize more than one camera to allow the signing person "free" movement in his or her environment to track down spatial positions in that environment.

In such a case, the installation should follow the following criteria:

1. Each camera is covering a separate angle.
2. Each camera operates independently of the other(s).
3. Angle overlap may or may not be permitted according to the pre-signing calibration.
4. Integration of input from multiple camera is performed
5. A defined figure with signing motions (where applicable) is rendered in conformity with allowable images (for persons). The same technique is useful in defining any objects or, alive, stationary or moving entities, such as animals.
6. Movements without signing are classified as null figures (coordinates are preserved).
7. The animated form of the signing figure can be shown in an "abbreviated" form when the person is not signing. That is, a figure not well defined with specific locations of fingers, etc. Such animated figures an occur for all null figures.

Recently, three dimensional video cameras have been developed. The use of such devices may facilitate recognition of signing motions by enhancing spatial differences.

Thus, it can be seen that the electronic communications system of the present invention provides an effective means for translating signing motions to speech or text for a hearing party using only a normal telephone at the hearing party's end of the line, and for translating speech to signing motions which are conveyed to the deaf party. The system may function as a telephone for the deaf, or as an on-site translator.

Having thus described the invention, what is claimed is:

1. An electronic communications system for the deaf comprising:
   (a) a video apparatus for visually observing the images of facial and hand and finger signing motions of a deaf person and converting the observed signing motions into digital identifiers;
   (b) means for translating said digital identifiers of said observed signing motions into words and phrases;
   (c) means for outputting said words and phrases generated by the visual observation of said signing motions in a comprehensible form to another person;
   (d) a receiver for receiving spoken words and phrases of another person and transmitting them;
   (e) means for translating said spoken words and phrases into a visual form which may be observed by the deaf person; and
   (f) means for outputting said visual form of said spoken words and phrases on said video apparatus for viewing by the deaf person.

2. The electronic communications system in accordance with claim 1 wherein said another person is at a remote location.

3. The electronic communications system in accordance with claim 1 wherein said video apparatus includes a video camera and image capture and processing hardware and software.

4. The electronic communications system in accordance with claim 1 wherein said translating means is located at a central station with which said video apparatus and said receiver and outputting means are in communication.

5. The electronic communications system in accordance with claim 1 wherein said translating means also includes artificial intelligence for interpreting and converting the translated signing motions into words and phrases and into coherent sentences.

6. The electronic communications system in accordance with claim 5 wherein said outputting means converts said coherent sentences into synthetic speech.

7. The electronic communications system in accordance with claim 1 wherein said outputting means converts said spoken words and phrases into written form.

8. The electronic communications system in accordance with claim 1 wherein said video apparatus includes a display screen.

9. The electronic communications system in accordance with claim 8 wherein said video apparatus provides an output of said spoken words and phrases as signing motions on said display screen for viewing by the deaf person.

10. The electronic communications system in accordance with claim 1 wherein said video apparatus includes a display screen to provide an output of said spoken words and phrases as signing motions on said display screen for viewing by the deaf person, and wherein said video apparatus includes a microphone and speaker whereby a deaf person may communicate with another person in the immediate vicinity.

11. The electronic communications system in accordance with claim 10 wherein said translating means is located at a central station with which said video apparatus and said receiver and outputting means are in communication.

12. In a method for electronic communication for the deaf comprising:
   (a) visually observing the images of facial and hand and finger signing motions of a deaf person and converting the observed signing motions into digital identifiers;
   (b) translating said digital identifiers of said observed signing motions into words and phrases;
   (c) outputting said words and phrases in a comprehensible form to another person;
   (d) receiving speech from said another person;
   (e) translating said speech of said another person into signing motions; and
   (f) displaying said signing motions representing said speech to said deaf person.

13. The electronic communications method in accordance with claim 12 wherein said another person is at a remote location.

14. The electronic communication method in accordance with claim 13 wherein said step of outputting at a remote location is effected by transmission of said translated words and phrases to a communications device receiver at said remote location.

15. The electronic communication method in accordance with claim 12 wherein said step of observing and converting the signing motions is effected by a video camera.

16. The electronic communication method in accordance with claim 12 including the step of transmitting said digital identifiers of said motions and said speech electronically to a central station where said translating steps are performed.

17. The electronic communication method in accordance with claim 12 wherein said outputting step provides such words and phrases as synthetic speech.

18. The electronic communication method in accordance with claim 12 wherein said outputting step provides said words and phrases in written form to said another person.

19. The electronic communication method in accordance with claim 12 wherein said displaying step provides said words and phrases in written form.

20. The electronic communication method in accordance with claim 12 wherein said translating step utilizes artificial intelligence.

21. The electronic communication method and software in accordance with claim 20 wherein said intelligence is developed with the use of multiple neural networks automatically created and assigned by gesture type.

22. The electronic communication method in accordance with claim 12 wherein said another person and said displaying step are at the same location as said deaf person and wherein said visually observing and converting step utilizes a video apparatus.

23. The electronic communication method in accordance with claim 22 wherein said receiver and outputting steps are conducted by components of an installation including said video apparatus.

24. The electronic communication method in accordance with claim 22 wherein said translating steps are conducted at a remote center.

25. The electronic communication method in accordance with claim 12 wherein said translating steps are conducted at a remote center.

26. An electronic communications system for the deaf comprising:
   (a) a video apparatus for visually observing the images of facial and hand and finger signing motions of a deaf person and converting the observed signing motions into digital identifiers;
   (b) means for translating said digital identifiers of said observed signing motions into words and phrases;
   (c) means for outputting said words and phrases generated by the visual observations of said signing motions in a comprehensible form to another person;
   (d) a receiver for receiving spoken words and phrases of another person and transmitting them;
   (e) means for translating said spoken words and phrases into signing motions which may be observed by the deaf person; and
   (f) means for outputting said signing motions on said video apparatus for viewing by the deaf person, said translating means being located at a central station with which said video apparatus and receiver are in communication.

27. An electronic communications system for the deaf in accordance with claim 26 wherein said another person is at a remote location.

28. An electronic communications system for the deaf in accordance with claim 26 wherein said video apparatus includes a video camera and image capture and processing hardware and software.

29. An electronic communications system for the deaf in accordance with claim 26 wherein said translating means also includes artificial intelligence for interpreting and converting the translated motions into words and phrases into coherent sentences.

30. An electronic communications system for the deaf in accordance with claim 28 wherein said outputting means converts said coherent sentences into synthetic speech.

31. An electronic communications system for the deaf in accordance with claim 26 wherein said video apparatus includes a display screen.

32. An electronic communications system for the deaf in accordance with claim 26 wherein said video apparatus includes a display screen to provide an output of said spoken words and phrases as signing motions on said display screen for viewing by the deaf person, and wherein said video apparatus includes a microphone and speaker whereby a deaf person may communicate with another person in the immediate vicinity.

* * * * *